United States Patent [19]

Gabrys

[11] 4,125,247

[45] Nov. 14, 1978

[54] APPARATUS FOR MANUFACTURING FLUID SEALS

[75] Inventor: Kenneth F. Gabrys, Streamwood, Ill.

[73] Assignee: Chicago Rawhide Manufacturing Company, Elgin, Ill.

[21] Appl. No.: 872,490

[22] Filed: Jan. 26, 1978

Related U.S. Application Data

[63] Continuation of Ser. No. 378,494, Jun. 12, 1973, abandoned, which is a continuation of Ser. No. 137,207, Apr. 26, 1971, abandoned.

[51] Int. Cl.$^2$ .............................................. B29C 7/00
[52] U.S. Cl. ................................. 249/66 R; 249/105; 425/405 R; 425/438
[58] Field of Search ............... 425/DIG. 58, DIG. 59, 425/405 R, 438, DIG. 47, 577, 441; 249/67, 69, 66, 68, 59; 222/92

[56] References Cited

U.S. PATENT DOCUMENTS

| | | | |
|---|---|---|---|
| 2,717,793 | 9/1955 | Nenzell | 425/DIG. 47 |
| 2,778,533 | 1/1957 | Savary | 222/92 |
| 2,850,766 | 9/1958 | Press et al. | 249/68 X |
| 3,013,308 | 12/1961 | Armour | 425/242 |
| 3,063,097 | 11/1962 | Jutzi | 425/DIG. 47 |
| 3,064,310 | 1/1962 | Cooprider | 425/577 X |
| 3,108,339 | 10/1963 | Bricy | 425/812 |
| 3,193,884 | 7/1965 | Hagnie et al. | 425/DIG. 47 |
| 3,241,193 | 3/1966 | Pohlman | 425/DIG. 47 |
| 3,246,369 | 4/1966 | Rhoads et al. | 425/DIG. 47 |
| 3,315,316 | 4/1967 | Baney et al. | 425/DIG. 47 |
| 3,341,647 | 9/1967 | Aberle | 425/DIG. 47 |
| 3,343,222 | 9/1967 | Kacalieff | 425/441 |
| 3,357,057 | 12/1967 | Bricy | 425/149 |
| 3,392,226 | 7/1968 | McKinven | 425/DIG. 47 |
| 3,461,488 | 8/1969 | Croyle | 425/577 |
| 3,475,790 | 11/1969 | Bush | 425/DIG. 47 |
| 3,482,814 | 12/1969 | Hedgewick | 249/67 |
| 3,490,099 | 1/1970 | Smith et al. | 425/DIG. 47 |
| 3,534,443 | 10/1970 | Tucker | 249/68 X |
| 3,537,676 | 11/1970 | Miller | 425/577 X |
| 3,555,606 | 1/1971 | Hedgewick | 425/577 X |
| 3,613,223 | 10/1971 | Bush | 425/DIG. 47 |
| 3,621,533 | 11/1971 | Bertrandi | 425/246 X |
| 3,915,613 | 10/1975 | Ruck | 425/DIG. 58 |
| 3,940,103 | 2/1976 | Hilaire | 249/68 |

Primary Examiner—J. Howard Flint, Jr.
Attorney, Agent, or Firm—James T. FitzGibbon

[57] ABSTRACT

Various forms of apparatus are described for manufacturing half seal units by injection molding in specially constructed molds. The apparatus was developed in response to a need for producing precision parts, particularly so-called insert molded parts containing integral stiffening members surrounded by an elastomeric seal body. Seals of this type are mated upon installation in position of use to form a unitary seal which provides primary and secondary seals as well as a seal at the split line where the two half seals are joined. One described molding apparatus includes means adapted for formation of a mold cavity from horizontally movable, cam actuated mold parts wherein finished so-called piece parts are removed after molding by an axial movement with a specially constructed stripper assembly. Another described apparatus is adapted for injection molding of an elastomer in totally surrounding relation to a metal insert, following which the newly formed piece part is removed by sequential downward movement of plural separable mold parts. Flow of the elastomer in its uncured state is carried out so as to eliminate or minimize the formation of flash, or at least confine it to areas wherein formation thereof will not prove objectionable in the finished piece part, the molds are adapted to permit utilization of vacuum assistance for complete filling, and means are provided for automatically tear trimming the completed piece parts upon stripping thereof from the mold cavity.

11 Claims, 14 Drawing Figures

INVENTOR
KENNETH F. GABRYS
BY [signature]
ATT'YS

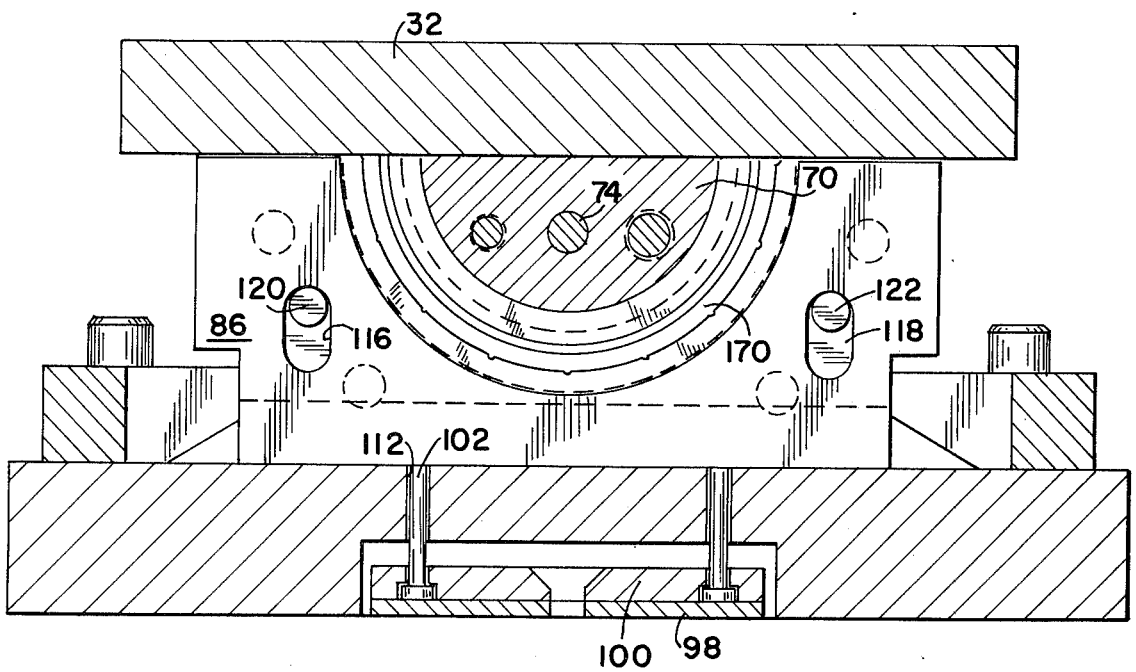
FIG. 4.
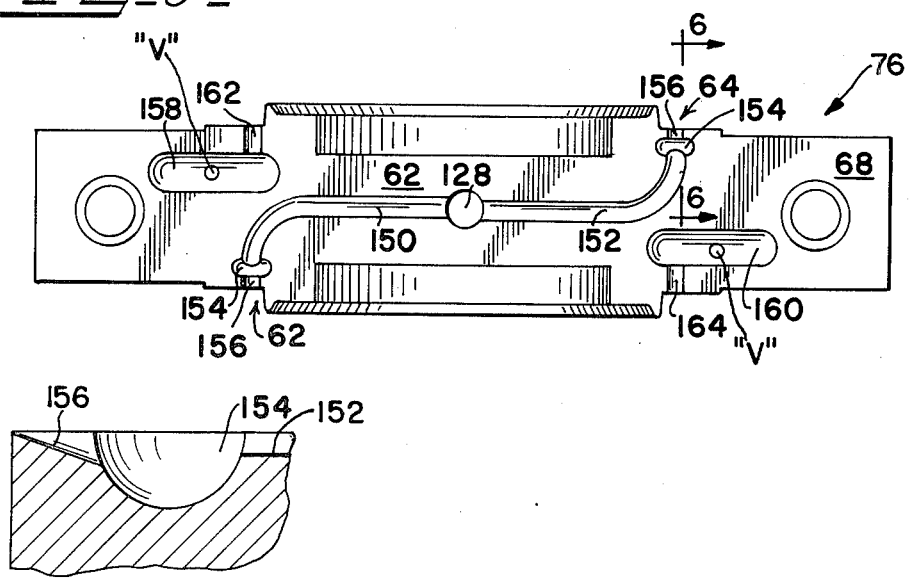
FIG. 5.
FIG. 6.
INVENTOR
KENNETH F. GABRYS
BY Dreist, Lockwood, Greenawalt & Dewey
ATT'YS

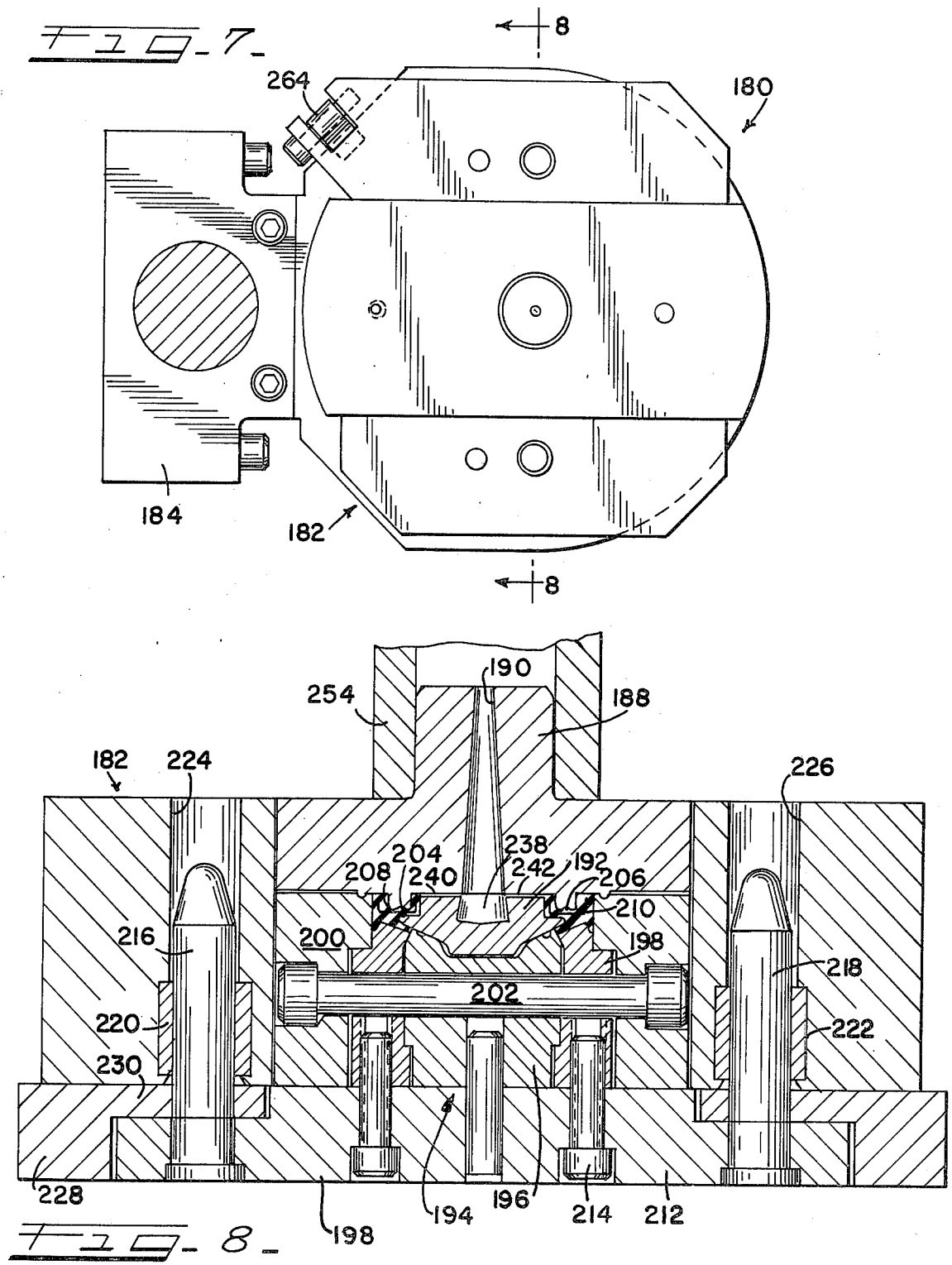

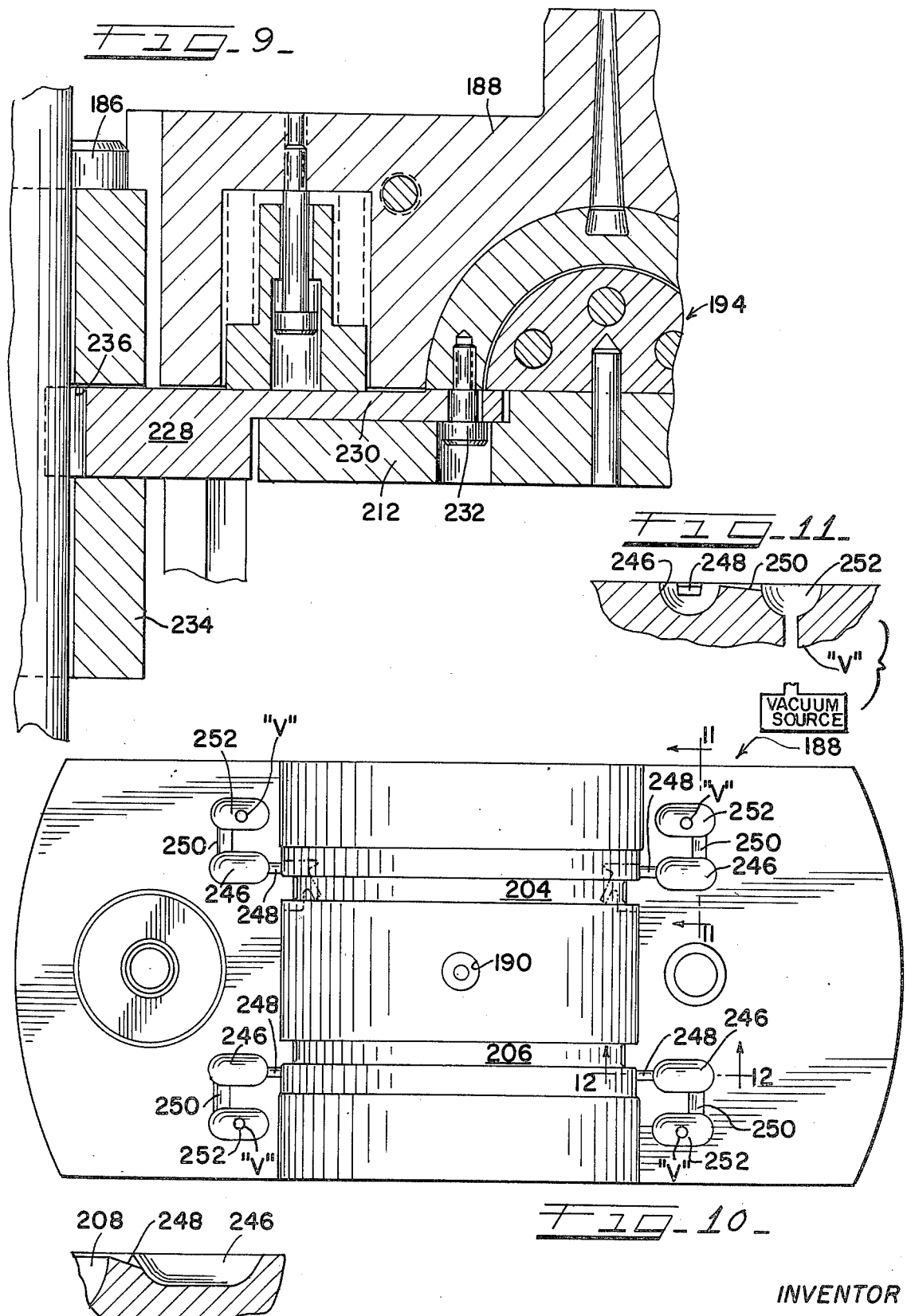

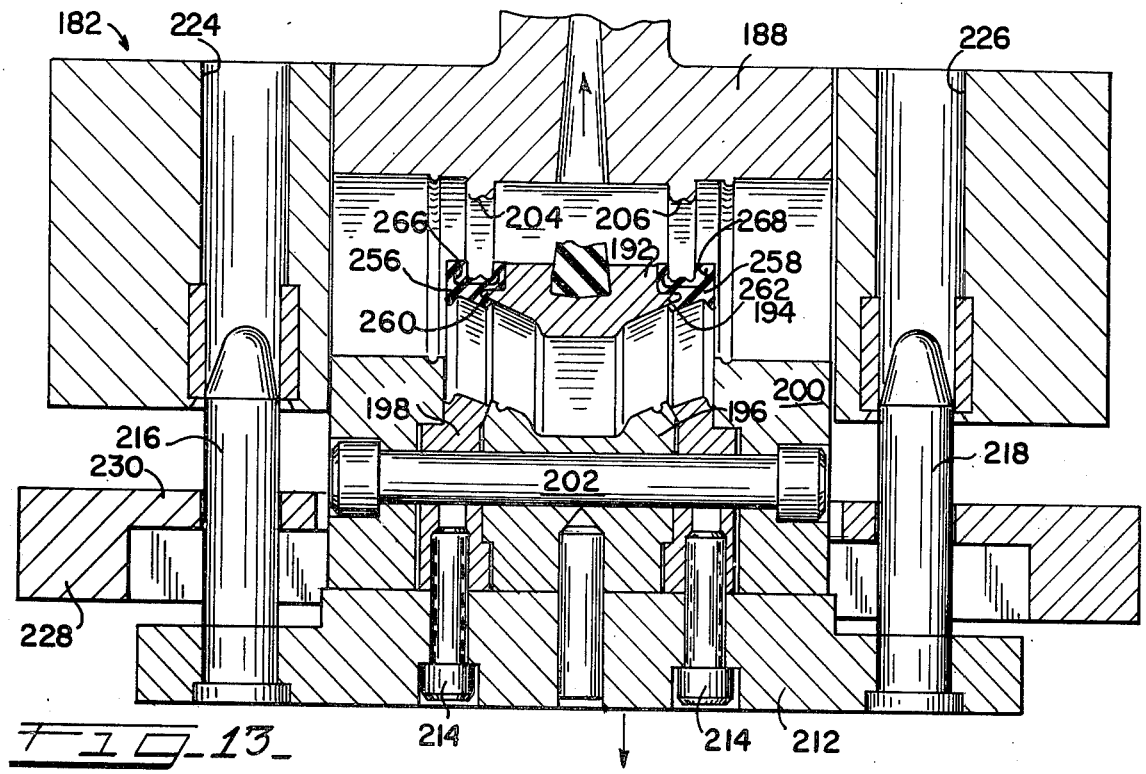
FIG_13
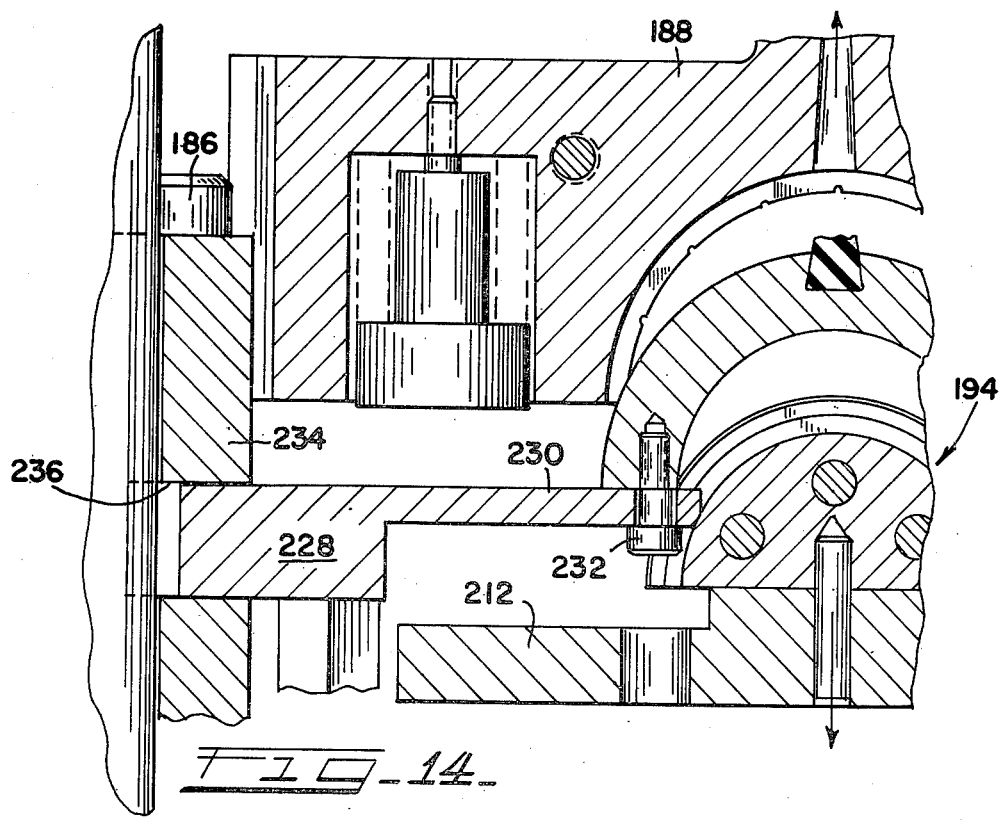
FIG_14

APPARATUS FOR MANUFACTURING FLUID SEALS

This application is a continuation of U.S. application Ser. No. 378,494, filed June 12, 1973, and now abandoned, which was a continuation of application Ser. No. 137,207, filed Apr. 26, 1971, and now abandoned.

BACKGROUND OF THE INVENTION

The present invention relates to apparatus for highly precise manufacture of individual cured elastomeric piece parts, such as fluid seals, and by way of example, to the manufacture of half seal units adapted to be placed together in an assembled relation for use as an annular shaft seal and characterized by the presence of a metal or other reinforcing stiffener therein.

Although molded products such as the half seal units of the type able to be manufactured by the techniques of the invention have a superficial appearance of simplicity, these units must be made at low cost under extremely precise conditions of manufacture. This is because, although the unit price of the piece parts is low, they are customarily installed in extremely inaccessible locations wherein replacement in the event of leakage would involve the expenditure of a great deal of labor. Because of extrinsic factors, such as the construction of associated parts with which the seals are to be used, such seals are commonly manufactured as half seal units for subsequent assembly. Typically, the complete seal units are used in automobile and truck engines as a rear main bearing seals, and therefore form a sealing fit with a reduced diameter section of the crankshaft lying behind the rear main bearing surface and ahead of an enlarged diameter flange to which the flywheel is secured. Since there is no axial access to this area, the seals are installed by halves, usually just prior to installation of the bearing caps. These units are expected to last for the anticipated lifetime of the engine and must resist physical and chemical attack, high peripheral speed and the like. Normally, therefore, such seals are made from synthetic elastomers such as silicone rubbers.

In view of the inaccessibility of the seal after installation, manufacturers of automobile engines and other components using these seals subject the finished half seals to a rigorous pre-installation inspection program, and the standards required of acceptable seals include freedom from voids or pock marks, absence of flash on most or all surfaces, very accurate radial and axial dimensional control, proper insert positioning, flatness of opposed edge portions which form the split line, and freedom from puckering or buckling during installation and use. The interest of the manufacturer in providing fully reliable seals is heightened by warranty obligations which are quite common and by a general interest in the quality image created by oil-tight assemblies.

Furthermore, known injection molds have not been satisfactory to provide high quality parts such as those required in certain original equipment oil seal applications, such parts having previously been characterized by unevenness, distortion of inserts, the presence of knit lines and flash, and other drawbacks which have characterized attempts to mold rubber products along the lines previously used in the manufacture of non-precision thermoplastic products.

In view of the foregoing disadvantages of prior art methods and apparatus, it is an object of the present invention to provide one or more suitable apparatus for making improved precision molded products.

A further object is to provide molding apparatus capable of producing finished parts having a minimum of flash and having whatever flash may be produced confined to particular, predetermined locations.

Another object is to provide molding apparatus wherein a single force press system may be used to provide for mold clamping and part removal along two different axes.

A further object is to provide a molding apparatus providing for positive stripping and removal of a finished part having undercut surfaces and the like without bringing about damage to the finished parts.

Another object is to provide a molding apparatus characterized by particular locations of flash gates and elimination of the necessity to register the top and bottom mold plates to obtain accurately formed parts.

A further object is to provide an apparatus suitable for multiple injection molding of half seals and like parts in a symmetrical half seal design.

A further object is to provide in one embodiment of the invention, a mold having single axis movement and including a mechanically operated stripper plate for cooperative use with a self centering stripper core.

Another object is to provide a molding apparatus characterized by balanced in flow of the fluent elastomer prior to curing thereof.

A still further object is to provide molds which, upon part removal, eliminate the application of tearing stresses to critical areas.

Another object is to provide a molding apparatus wherein so-called knit lines, voids, flash, and other undesirable finished product features may be avoided or minimized.

A still further object is to provide a mold construction which is compatible with existing equipment utilizing vertical movements for preliminary closure, closure during injection, and rubber injection, all on a common axis.

It is a further object of the invention to provide a molding apparatus for use in precision manufacture of parts having an elastomeric component wherein opening the apparatus for part removal inherently simultaneously supports the part against movement and operates to tear the web of elastomeric material between the sprue and the part at a precisely determined point.

Another object is to provide a molding apparatus including a mold unit which is vented, such as to a vacuum source, so as to permit relatively low cavity pressures, thereby helping to evacuate gases formed during molding and lowering injection pressures so as to minimize or eliminate flash formation.

A further object is to provide molding apparatus wherein means are provided for receiving any overflow of elastomer necessary to provide complete mold filling and to provide this feature in an arrangement having means to prevent mold clogging.

These and other objects and advantages of the invention, including certain inherent objects and advantages thereof, are achieved by providing, on the one hand, a molding apparatus having at least one molding cavity defined at least partially by mold sections adapted to move axially for stripping the piece parts from the cavity and having means associated with these sections for ejecting finished, molded parts transversely to the axis of mold opening by subsequently actuable ejectors adapted for cooperation with the strippers in the opened position of the mold, and on the other hand, by a mold unit having a center inlet and means for drawing the injected elastomer toward opposite end face surfaces, and wherein a first vertical mold opening movement sequence partially strips the part from the mold cavity and further stripping is accomplished by subsequent movement of a lower mold portion, leaving the finished part suspended between separated upper and lower mold parts.

The manner in which the invention achieves these objects and advantages, and others, may be best understood when reference is made to the following detailed description of the preferred embodiments of the invention, set forth by way of illustration, and when reference is made to the accompanying drawings, wherein like reference numerals indicate corresponding parts throughout.

BRIEF DESCRIPTION OF THE DRAWINGS

FIG. 4 is an end view, partly in elevation and partly in section, showing an axial end view of the molding cavity and a portion of the stripper mechanism;

FIG. 5 is a top plan view showing the mold runners and other elements of a part of the mold core;

FIG. 6 is an enlarged fragmentary view of a portion of the mold core of FIG. 5;

FIG. 7 is a top plan view of another form of mold embodying the present invention;

FIG. 8 is a vertical sectional view through the mold of FIG. 7, shown on an enlarged scale and taken along lines 8—8 of FIG. 7;

FIG. 9 is an enlarged fragmentary sectional view of the mold of FIGS. 7 and 8, taken at right angles to the view of FIG. 8, and illustrating an axial view of the mold in the closed position;

FIG. 10 is a bottom plan view of the upper cavity block of the mold of FIGS. 7-9 showing certain parts of the product dump and vacuum pockets therein;

FIG. 11 is a view taken along lines 11—11 of FIG. 10 and showing a vacuum pocket and one of the product receiving pockets of the upper cavity block;

FIG. 12 is a view taken along lines 12—12 of FIG. 10 and showing one of the product receiving pockets;

FIG. 13 is a view similar to the view of FIG. 8, but showing the mold in an opened position and;

FIG. 14 is a fragmentary axial end view, partly in section, similar to FIG. 9 but showing the mold in an opened position.

Since the practice of the invention is not limited to any exact construction of mold, reference will be made herein to preferred molds for manufacturing seals of the invention, and in this connection, it will be understood that the orientation of the seal units as manufactured and the molds used to manufacture them are arbitrarily shown in certain positions of use, but that these portions are not necessary features of the invention. Thus, when words indicating direction or orientation are used, it will be understood, unless specifically stated otherwise, that these terms are not intended to imply that such positions or orientations are necessary to successful practice of the invention.

Figure 1:
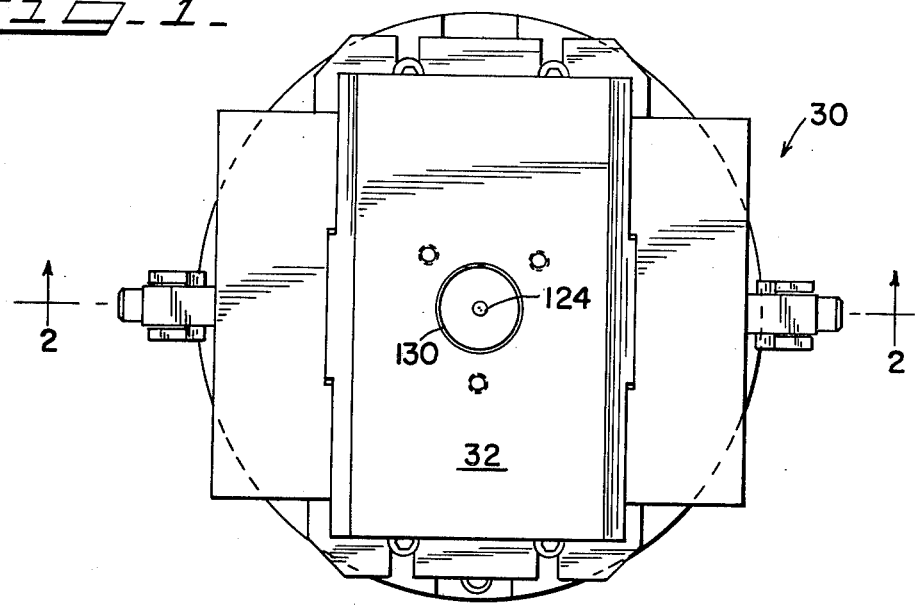
FIG. 1 is a top plan view of an assembled and closed form of a cam action mold made according to the invention.
Figure 2:
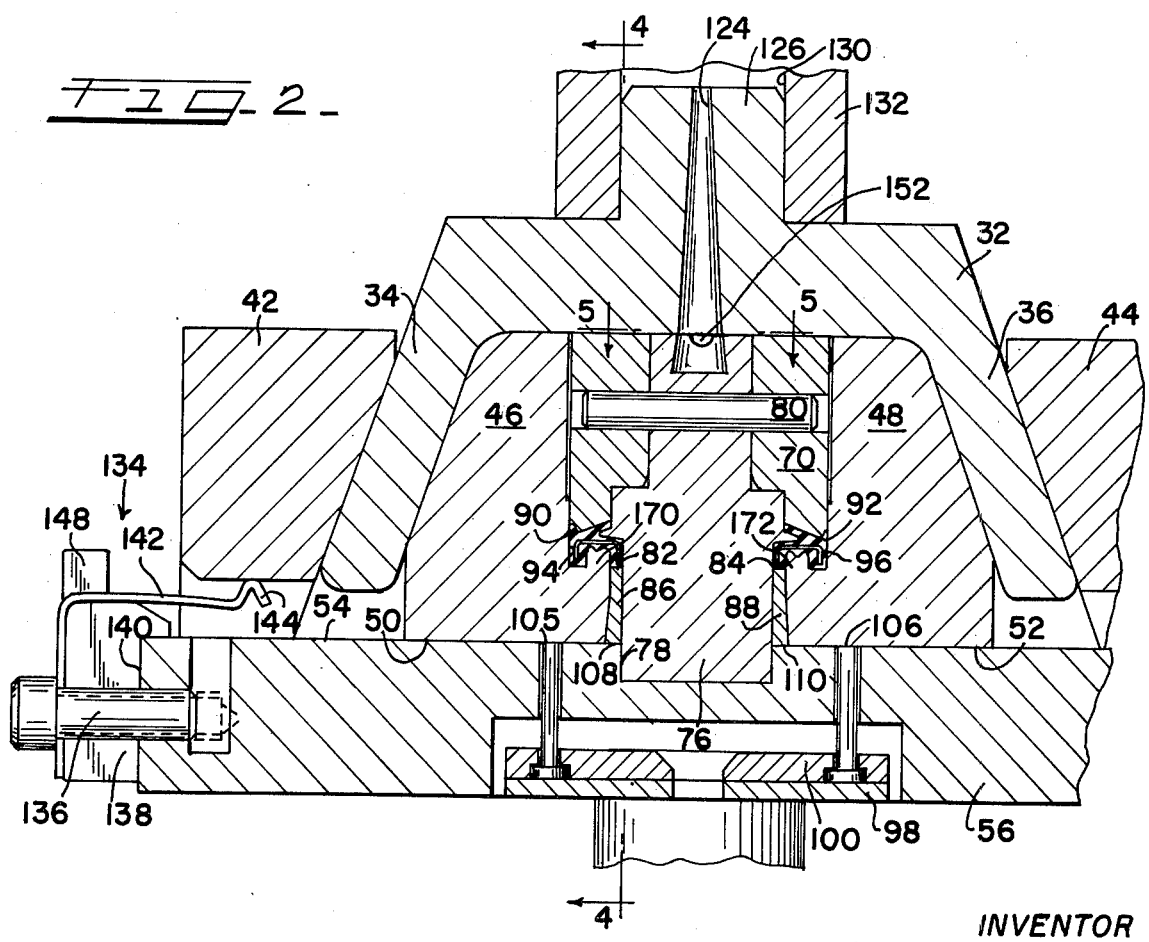
FIG. 2 is a vertical sectional view, on an enlarged scale, showing the mold of FIG. 1 in a closed position and taken along lines 2—2 of FIG. 1.
Figure 3:
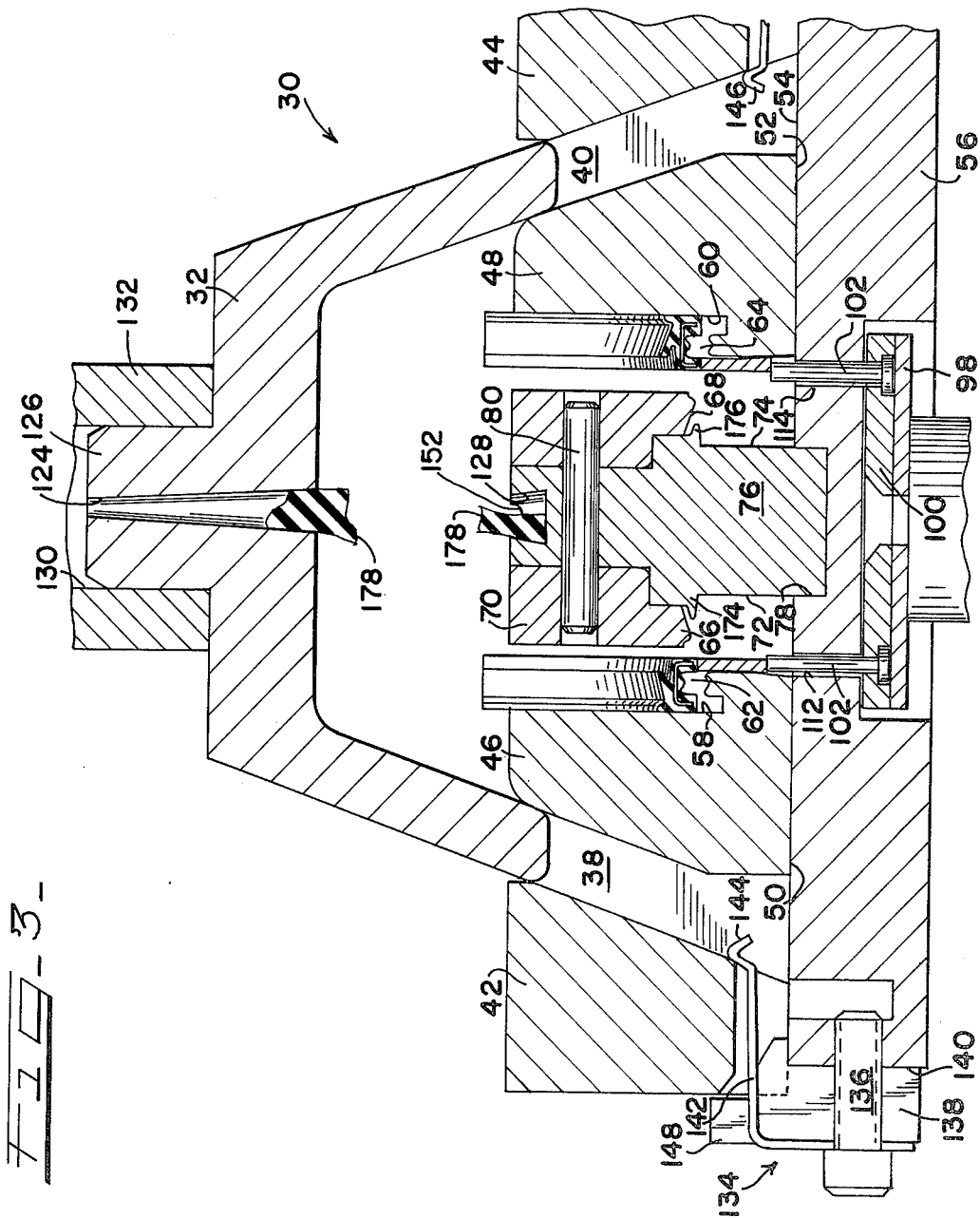
FIG. 3 is a further enlarged vertical sectional view, similar to FIG. 2 but showing the mold in an open position.

Referring now to the drawings in greater detail, one form of apparatus of the invention is illustrated in FIGS. 1 through 6, and is shown to comprise a typical mold generally indicated at 30, in which fluid seal units may be manufactured according to the invention. As shown in FIGS. 1-3, the mold 30 includes a sprue plate 32 which includes downwardly and outwardly inclined arms 34, 36 extending into a pair of inclined, oppositely disposed slots 38, 40 lying within a pair of oppositely disposed outer cavity blocks 42, 44 each of which includes an inner section 46, 48 having respective lower surface portions 50, 52 thereof resting on the upper surface 54 of a base plate 56. Precisely finished inner surfaces 58, 60 (FIG. 3) on the inner sections 46, 48 of each cavity block 42, 44 partially define oppositely disposed molding cavities 62, 64. Some additional portions of the cavities 62, 64 are defined respectively by precisely formed surfaces 66, 68 forming a part of a core insert unit 70, and still other cavity-forming surfaces 72, 74 forming a part of a core bar 76. The core bar 76 is received within a groove 78 in the base plate 56 and has the upper portion thereof locked to the core insert 70 by a dowel pin 80.

The remaining inner surfaces of the part molding cavities 62, 64 are formed by generally upwardly and inwardly directed surfaces 82, 84 on a mirror image pair of cavity shims 86, 88. Accordingly, referring in particular to FIG. 2, it may be seen that a pair of half seal units 90, 92 each having a metal or other relatively rigid stiffening insert 94, 96 therein may be formed within the cavities 62, 64.

Referring particularly to FIGS. 2 and 3, other construction features of the mold 30 may be seen, including the provision of a backing plate 98 supporting an ejector plate 100 which serves to position a pair of ejector pins 102. The upper surfaces 104, 106 of these pins 102 are adapted to engage the lower surfaces 108, 110 of the cavity shims 86, 88 when the shims 86, 88 are moved by the cam action of the mold into vertical alignment with the slots 112, 114 receiving the ejector pins 100, 102.

Referring to FIG. 4, it is shown that a pair of elongated slots 116, 118 are provided in each of the cavity shims 86, 88 to permit a typical shim 84 to move in vertically guided relation, since the slots 116, 118 are provided with a pair of transversely extending guide pins 120, 122. Referring again to FIGS. 1-3, it will be noted that a part of the runner system for the fluent elastomeric material to be molded includes an upper channel 124 which extends upwardly through the nose portion 126 of the sprue plate 32, and that an oppositely facing, slightly undercut opening 128 is provided in the upper portion of the core bar 76. Reference will be made elsewhere herein to other details of the runner system for the fluent elastomeric material; however, it will be apparent from a consideration of FIGS. 2 and 3 that alignment between the sprue plate 32 and an associated injector may be facilitated by registration of an inner surface 130 of a sleeve 132 forming a part of the injector assembly (not shown) with the nose 126, whereby the channel or bore 124 will be properly centered with respect to the injector from which it will receive the charge of material.

Referring again to FIGS. 2 and 3, the numeral 134 generally designates a spring retainer system which includes a fastener 136 retaining a block 138 in position adjacent an outer surface 140 of the base plate 56 and serving to position a leaf spring 142 having a nose portion 144 adapted to extend into the slot 38 when the outer block 42 is in the fully opened position. A corresponding nose portion 146 is present on a similar spring retainer system (not completely shown) for the outer block 44 on the opposite side of the mold unit 30, as shown, whereas the nose 144 retains the outer block 42 in an outward position so that the weight of the sprue plate 32 does not tend to force the mold closed in the absence of a strongly applied vertical force, a shoulder portion 148 of the block 138 serves an an outward movement stop for the outer mold block 42, to prevent unintentional disassembly of the mold 30.

Referring now to FIG. 5, a top view of the core bar 76 is shown to include a pair of runners 150, 152 lying to either side of the opening 128 and adapted to receive the fluent curable elastomeric material from which the seal units will be made.

Each runner 150, 152 terminates in a tear trim pocket 154 from which the fluent material passes to the interior of the molding cavities 62, 64 by way of passages 156 of greatly reduced cross section. The cavities 62, 64 extend in semi-circular fashion from points adjacent passages 156 to points adjacent a pair of vacuum dump pockets or chambers 158, 160, each of which has a tapering entrance portion 162, 164 of very small cross sectional area and typically characterized by a height or depth of about 0.001 inches.

Each of the chambers 158, 160 is adapted to communicate with a vacuum source shown schematically in FIG. 11 so that there will typically be a negative pressure in the molding cavity 62, 64 at all times. In this manner, any gaseous products formed during vulcanization of the rubber are eliminated rather than entrapped within the finished product in the form of bubbles or voids. Furthermore, the presence of vacuum aids in filling out the cavities without necessitating the use of increased molding pressures which by their nature tend to increase problems of flash. Accordingly, in order to carry out the above objects, each of the vacuum dump pockets or chambers 158, 160 communicates with a vacuum source through appropriate mold passages or otherwise in a manner which is conventional and known to those skilled in the art.

Referring now to the operation of the mold of the type shown in FIGS. 1-6, inclusive, it may be assumed that the mold is in the open position of use illustrated in FIG. 2, and that only the inserts 94, 96 are loaded into the cavities 62, 64. Thereupon, the downward movement of the sprue plate 32 causes the outer blocks 42, 44 to be moved together so that the inner sections 46, 48 thereof move into a position where the inner surfaces 58, 60 thereof abut the cavity shims 86, 88 in tight fitting relation. In this process, the backing and ejector plates 98, 100 ride downwardly prior to movement of the sprue plate 32 to permit inward movement of the outer blocks 42, 44. At this point, with the mold in the closed position as shown in FIG. 2 and with the sprue plate 32 held down by a force acting through sleeve 132, hot rubber is injected through the bore 128. After filling the channel 124, the rubber moves through the runners 150, 152, fills the tear trim pockets and the passages 156 and moves into the molding cavities 62, 64.

In the illustrated form of the invention, it may be assumed that the inserts 94, 96 contain plural openings or apertures therein to permit rubber to flow therearound and therethrough to form the complete half seal units 90, 92. After curing of the elastomeric portion of the seals, the entire seal units 90, 92 are ready to be removed. For this sequence, the sprue plate 32 is raised causing a gradual outward movement of the outer blocks 42, 44 and their associated inner sections 46, 48. As shown, this direction is axially of the seal, considered from its ordinary position of installation surrounding a shaft or the like. Since a pair of annular lands 170, 172 forming a part of the inner mold section 46, 48, extend inwardly into the inverted "U" shape of the finished seal, such axial outward movement of the blocks 42, 44 and their associated inner sections 46, 48 carries the finished seals or other piece parts therewith. This serves to strip the seal part away from the core bar 76, without significant resistance or damage, since the tapered lands 174, 176 formed thereon are not in any way undercut.

Upon initial separation, the surfaces 66, 68 of the core insert 70 serve to deflect the lip portion of the half seal units somewhat, but the action of the surfaces on the seal lip does not meet with significant resistance because the lands 174, 176 forming a portion of the mold core have already been withdrawn. When the blocks 42, 44 have reached the maximum outward position shown in FIG. 3, the ejector pins 100, 102 have moved into a position of registry with the cavity shims 86, 88, it being understood that these shims 86, 88 are carried by the pins 120, 122 (FIG. 4). Thereupon, upward movement of the ejector and backing plates 98, 100, which is timed to occur coincidentally with or after the blocks 42, 44 have reached their maximum outward movement, the seal units 90, 92 are lifted vertically to the position shown in FIG. 3 so that the same may be readily removed as a finished piece part and without any resistance or interference which would tend to damage the finished part.

From the foregoing description, the significance of the tear trim pockets 154 and the passages 156 may be appreciated. In use, the tear trim pockets 154 are constructed so as to have a significant depth in relation to the depth of the product inlet passages 156. Furthermore, the passages 156 are ordinarily relieved or tapered, with the thinnest cross-sectional areas thereof lying most closely adjacent the entrances to the molding cavities 62, 64. Thus, when the finished part is molded, a relatively massive section thereof lies within the molding cavity, and the elastomer is fully cured. Therefore, the material within the channels 150, 152 and within the channel 124 is also cured. Since the section in the tear trim pocket 154 is enlarged and of significant thickness, it is trapped therein and cannot be permitted to escape as long as the sprue plate 32 is in a closely overlying relation to the core bar 76.

Accordingly, upon even the slightest outward movement of the inner section 46, 48 containing the ribs 170, 172, a stress is placed on the thin webs of rubber lying within the passages 156, causing them to tear away from the finished piece parts. Even though the mold operates by cam action and the sprue plate 32 is lifted simultaneously with the movement of the inner mold section 46, 48, there is easily enough axial movement of the completed seal part 90, 92 to break this thin rubber web before the sprue plate 32 has lifted a distance equal to or greater than the depth of the tear trim pocket. Accordingly, this feature provides one method of localizing the flash and achieving trimming thereof by the inherent or automatic operation of the mold. Furthermore, once the parts are removed or ready for removal, the solidified sprue 178, which includes the material remaining in the opening 128 and in the channels 150, 152, the pockets 154, etc., is ready for removal by a known type of picker. Since, as shown in FIG. 6, the entrance portions or passages 162, 164 are extremely shallow adjacent their point of entry to the molding cavities, air and other gases may pass therethrough, but the elastomeric material will not. Since the pockets or chambers 158, 160 are not filled with rubber, removal of the sprue 178 with all its attached flash serves to empty the mold completely and prepares it for another cycle. In connection with the foregoing description, it may be observed that a preferred use of the mold of the present invention is to produce so-called half seal units which are assembled to form a complete annular seal unit and used in applications such as automobile engine crankshaft seals. In practice, these half seals must be very precisely made since they are inspected rigorously to detect the presence of flaws, particularly including those relating to incompletely filled out seals or those containing voids, the presence of flash, particularly around the primary and secondary sealing lip areas, and for sufficiently sharp, flat and smooth edges, particularly at those surfaces where portions of the half seal are adapted to meet and mate with corresponding, oppositely directed parts on the other half seal to form a completely fluid-tight seal at the split line. Although a number of efforts to produce seals of this type in commercial quantities under satisfactory conditions of quality control have been attempted often, including attempts using the techniques of compression and transfer molding, and although injection molding has been commercially attractive for non-precision or low-precision thermoplastic parts, it has not heretofore proved suitable for making highly precise rubber parts, particularly on a commercial scale. One major reason for this fact has been the differing natures of rubber and plastic; thus, for example, thermoplastic materials are not naturally highly fluent when injected, but have only been melted and are true plastics in the sense that they undergo softening or decreasing viscosity when heated. However, rubber is quite commonly, when injected, more analagous to a true liquid, whereas, upon curing it becomes a true solid. Accordingly the change in viscosity thereof during molding thereof is much greater than that of thermoplastic materials, and the problem of flash has therefore been a chronic problem with molded rubber parts, whereas it has not been particularly troublesome with plastic. Furthermore, as multi-part molds are called for the eliminate problems of part removal where undercut surfaces are present, for example, the problem of flash has further increased. Moreover, vulcanization of rubber often involves numerous and complex chemical reactions, unlike plastic forming, which involves merely melting, and accordingly there are gas reaction products and the like inherently present during part formation, and the presence of this gas must be taken into account. Accordingly, the problems of flash, part trimming, freedom from damage during ejection and the like are important problems which have been overcome by the combination of features provided by the present technique and apparatus.

Referring now to FIGS. 7-14 inclusive, there is shown another form of the mold assembly 180, which is suitable for use in an injection molding process. As shown in FIG. 7, the principal portion 182 of the mold assembly 180 is supported by a mounting flange 184 through which a vertical shaft 186 extends, it being understood that the shaft 186 is a part of the turret assembly of a known type molding machine which receives a plurality of the mold units 180. Such an apparatus is described in detail in U.S. patent application Ser. No. 771,059, filed Oct. 28, 1968, now U.S. Pat. No. 3,621,533 but an understanding of such machine being unnecessary to an understanding of the present invention, further description thereof will be omitted.

Referring now to FIGS. 7 and 8, other principal elements of the mold unit 180 are shown to include an upper cavity block 188 having therein a central opening 190 which forms a part of the channel for passage of a fluent elastomeric material and in which the sprue will eventually be formed, a saddle type stripper core 192, and a lower core assembly 194 (FIGS. 8, 9 and 14) comprised of three principal elements, namely, a center core 196, an insert core 198, and an outer core block 200. These elements are held together in use by a transversely extending fastener 202. The inner surfaces of the assembly 194, the outwardly extending portions of the saddle stripper unit 192 and the annular lands 204, 206 forming a part of the cavity block 188 combine to define a pair of cavities 208, 210 having the contours of the seal or like part which is to be molded therein as will presently be described.

Referring again in particular to FIG. 8, a base plate 212 is shown, which includes plural fasteners 214 attaching the same to the lower core assembly 194. The base plate 212 also includes a pair of vertically extending pins 216, 218 received within guides 220, 222 fitted into openings 224, 226 in the principal portion 182 of the mold 180. By reference to FIGS. 13 and 14, it can be seen that a stripper plate 228 is provided for supporting the saddle stripper 192, and that the stripper plate 228 has a shoulder portion 230 thereof overlying a portion of the base plate 212. Fasteners 232 are provided for holding the saddle stripper core 192 in fixed relation to the stripper plate 228. Since the stripper plate 228 and its associated parts are also movable with respect to the base 212, as shown in FIG. 9, an auxiliary clamp unit 234 movably supported on the shaft 186 and having a slot 236 therein may serve to support the stripper plate 228 independently of either the upper cavity block 188 or the base plate 212. The significance of this feature will appear elsewhere herein.

Referring now to the passage system for the fluent elastomeric material, it will be seen from FIG. 8 that the central channel or opening 190 communicates with a sprue base opening 238 and a pair of reduced height channels 240, 242 extending axially outwardly therefrom and terminating within the molding cavities 208, 210 respectively. Although not shown in detail, it is understood that each channel 240, 242 communicates with its associated cavity 208, 210 by means of a port of reduced height portion similar to its counterpart in the passages 156 of the mold unit shown in FIG. 5. In this arrangement, in contrast to the earlier shown form, the completed seal units formed in the cavity 208, 210 will have the end face portions thereof lying in face down relation to the stripper plate 228. Since, as in the other embodiment, it will be desirable to draw a vacuum within the molding cavity 208, 210 to evacuate air in the cavities as well as the gases formed during vulcanization to insure complete fill-out of the molded part and to reduce the overall pressure required in molding and consequently to minimize flash, the lower surface of the upper cavity block 188 is preferably arranged as shown in FIG. 10.

Referring now to FIG. 10, which in the orientation of parts shown in FIGS. 7–14, is a bottom plan view of the block 188, it will be seen that the block 188 includes a bottom surface 244, and that lands 204, 206 partially define the cavities 208, 210 which form the outer surface of the finished half seal units. Each corner of the block 188 includes a so-called product dump pocket 246, a product dump passage 248, a vacuum 250 and a vacuum dump pocket 252. Although the cavities 208, 210 are also defined in part by other of the core elements, it will be understood that the only communication between the interior of the cavities 208, 210 and the exterior thereof is by way of the product inlet passages 240, 242 and the product dump passages 248. In this embodiment of the invention, unlike the embodiment shown in FIGS. 1–6, means is provided for receiving excess elastomeric material to insure complete filling of the mold cavity. Thus, in use, the depth of the passages 248 is generally of the order of about 0.005–0.007 inches, whereas the passages between the vacuum pockets 252 and the product dump pocket 246 are preferably only about 0.001 inch. This insures that, in use, any excess elastomer will be trapped in pockets 246, whereas no such fluent material will flow through the reduced height passages 250. Accordingly, even if the pocket 246 is entirely filled with product, the pocket 252 will not contain any product, thus eliminating the chance of plugging the vacuum system. By reference to FIGS. 11 and 12, it may be seen that the passage 248 is relieved adjacent the pocket 246 and is of reduced height adjacent the molding cavities 208, thereby also serving as a tear trim area in the manner described in connection with the form of mold shown in FIGS. 1–6, inclusive.

In the use of the form of mold shown in FIGS. 7–14, it will be assumed that turntable (not shown) has indexed the entire mold assembly 180 to a position just beneath a sleeve or collar portion 254 of an associated injector (not shown). With the mold in the closed position, vacuum is drawn in the pockets 252 and accordingly, a vacuum is present in the cavities 208, 210. The fluent elastomer is injected through passage 190 and through the channels or passages 240, 242, totally filling the interior of the cavities 208, 210 from the centers thereof, with any excess material passing through the passages 248 into the pockets 246. After injection, the shaft 186 carries the mold assembly 180 to a position removed from the injector sleeve 254 and the parts just molded are allowed to cure. After curing, the cavities are opened in sequence, first by moving the clamp 234 downwardly on the shaft 186. In this step, the stripper plate 228 and the base plate 212 move down together. After movement to a limited degree, a stop (not shown) engages the clamp 234 and prevents further downward progress of the stripper plate 228 and saddle stripper 192. During this sequence, parts 256, 258 have passed downwardly while held on the saddle stripper core 192, since the lands 204, 206 are freely removable from the finished part, whereas the ribs 260, 262 on the saddle stripper core 192 serve to retain the seal in place with respect thereto. After the stripper plate 228 has encountered the stop, the base plate 212 continues downward movement, pulling the lower core assembly 194 away from the finished parts 256, 258, leaving them suspended on the saddle stripper core 192 from which they may be readily removed by axial movement. With the mold in the completely opened position shown in FIGS. 13 and 14, the sprue will be held within the base opening 238, and, upon moving the upper cavity block 188 upwardly about the hinge point 264 (FIG. 7), the sprue will be readily accessible for picking up by known means. As in the foregoing illustration of FIGS. 1–6, the cured elastomer will normally break along the thin web portions and the sprue includes the rubber remaining in the channels or passages 240, 242. Similarly, the scrap or flash remaining in the pockets 246 may be readily separately removed and, with new inserts 266, 268 placed in position within the cavities 208, 210, the molding operation is ready to be repeated.

As pointed out, the form of mold illustrated in FIGS. 7–14 also enables the finished parts to be held in place while the mold is opened in steps for stripping, part ejection and sprue removal. Furthermore, as in the form of mold shown in FIGS. 1–6, the trim or flash is torn away at predetermined points, and, by reason of the arrangement of the product dump pockets and the vacuum pockets and passages, a vacuum assisted or relatively low pressure, flashless molding operation may be carried out at production rates, affording significant economy and outstanding quality.

In the forms of the invention illustrated, the molded piece part was a half seal unit which included a metal insert therein, entirely surrounded and encased by the rubber material. One material commonly used to make such seals is a silicone elastomer. However, the principles of the present invention are applicable to the production of other parts, with or without inserts therein, and any vulcanizable elastomer may be used therein with good results. It has been found that seal units made according to the present invention are characterized by a virtually complete absence of torn lips, by complete fill-out, and by absence of flash from any surfaces where the presence thereof is objectionable.

One of the most important problems of the prior art which are typically overcome by molds made according to the present invention is the problem of damage to the parts during removal thereof from the mold. An example of such damage is damage to a half seal of the type shown in the drawing which occurs in the area just radially outwardly of the primary lip portion where the lip joins the seal body. This area is shown in FIG. 3 as being formed by the land 174, 176, and, in the embodiment of FIG. 13 for example, is located in the area of the lands 260 and 262. As will be noted, one form of the invention, namely the form shown in FIGS. 7–12, a construction is provided wherein there is no relative movement at all between the seal and the lands 260, 262 and accordingly, the removal of the seal does not in any way cause distortion of the primary sealing lip during part removal so as to creat the possibility of causing damage thereto.

As pointed out, the embodiment of FIGS. 1–6 involves a certain minimum stretching or deformation of the primary lip, but this deformation is minimal and does not in practice damage the piece parts. In contrast, seals made from mold sections of the type used in compression molding or transfer molding are unable to provide for parts removal without creating a danger of serious damage to the seal parts. Accordingly, an important feature of the invention is the removing of the seals from the molds in the manner described herein.

Another aspect of the invention which was referred to in passing, but not explained in detail, is the matter of symmetry of the runner systems of the molds, which is of particular importance in certain cases. Thus, in the case of a mold of the type shown in FIGS. 1–6 inclusive, the runner system is balanced or symmetrical, with respect to its disposition between cavities, so that the passage lengths as well as cross sections thereof are as uniform as possible. In this way, where two seals or like piece parts are manufactured in similar or identical cavities having the same internal volume, the cavities will be filled at virtually exactly the same rate by material tending to enter the cavities at the same rate. The importance of this feature may be understood, particularly in the case of rubber molding, by reference to the fact that as the rubber is undergoing cure at elevated temperatures, its viscosity is changing continually during the process, The rate of cure is dependent upon a number of conditions, but nevertheless, the kinetics of the reaction are such that cure does take place over a relatively short period of time, and accordingly uniform products cannot be made where one cavity would tend to be filled first and another cavity in the system be filled later with the same charge of rubber. In such a case, one piece part would be formed of material which was very incompletely cured upon reaching its final molded shape, while the second piece part would be formed with rubber which was of much higher viscosity and perhaps qualitatively of a different character when it was being formed. Accordingly, these two piece parts might well differ in a number of important physical characteristics, depending on the nature of the rubber from which they were formed.

The immediately foregoing considerations are quite important in a number of different rubbers, particularly when curing is sought to be achieved in a short time for economical mass production. Accordingly, consideration should be given to balancing of the runner systems and general mold symmetry as between plural cavities when the rheology or other aspects of the curing reaction cause significant changes in the character of the material as it is being injected or cured. This is one of the important respects referred to elsewhere herein in which rubber material differs from typical plastic materials which are commonly formed by injection molding.

Another aspect of symmetry of mold design is shown and may be explained in relation to molds of the type shown in FIGS. 7–14. In this construction, the mold runners or inlets 240, 242 are not only symmetrically placed with respect to the two opposed cavities, but are also designed so that injection takes place generally centrally of the cavity with the fluent, curing material moving in opposite directions toward the seal end faces as injection progresses. A mold construction of this type is advantageous where the earlier referred to factors or curing rate and rheology or flow characteristics during curing are significant. In this connection, it has been discovered that, in the case of certain rubber materials, piece parts made using a mold runner system of the type shown at 150 and 152 in FIG. 5 had different wear resistance characteristics adjacent different end faces. After considerable research, it was discovered that this difference in ability to resist wear was apparently accounted for at least in part by irregularities or aberrations in the density of the cured material, such as low density adjacent one end, with the result that the finished piece part was comprised of the same material but different parts of the seal were of different hardness and strength. This was believed to be caused by the change in rubber character brought about by curing or setting up of the elastomer in different parts of the mold, inasmuch as different parts or areas of the cavity were filled significantly earlier than other parts. It was also thought that continued injection may have caused flow patterns in portions of the rubber in a relatively advanced state of cure which served to lower the density of the rubber and reduce its resistance to wear.

In considering some of the foregoing matters, it must be borne in mind that it is extremely undesirable to substitute for precise and proper mold design by application of unduly high injection pressure forces, since, fluids of the type in question being substantially incompressible, applying excessive molding pressure not only causes flash, but serves to distort the mold sections themselves and may damage the molds or force them apart. Accordingly, in the case of those materials wherein density undergoes change during curing or wherein the material undergoes significant change flow properties during injection, balancing the flow among various cavities as well as within individual cavities is often important and may be carried out as taught herein.

It will thus be seen that the present invention provides novel molds for forming elastomeric parts and thus achieves the object set out specifically herein and other inherent objects and advantages. It is apparent that modifications and variations of the described embodiments of the invention will be apparent to those skilled in the art, and it is therefore contemplated that such changes may be made without departing from the spirit of the invention or the scope of the appended claims.

Reference herein has been made to the use of vacuum which is present in the molds, such as in pockets 158, 160 and 246, 252, as well as in molding cavities 62, 64 and 208, 210. The use of such systems being well known in the rubber molding and related molding arts, details thereof are not shown, except that passages "V" are shown in the pockets 158, 160 of FIG. 5, in the pockets 252 in FIG. 10, and extending downwardly from pocket 252 in FIG. 11 to a schematically represented vacuum source.

I claim:

1. A multi-part mold assembly for manufacturing molded articles from a curable, initially fluent elastomeric material, said assembly comprising at least first and second, relatively movable mold parts each including surfaces thereon generally directed toward corresponding surfaces on the other of said mold parts, all of said surfaces combining to define a molding cavity having the shape of an article to be molded, said first mold part having a first land extending into said molding cavity along a first axis extending generally radially of said article, said second mold part having a second land extending into said molding cavity along an axis generally parallel to the axis of said article, said first and second lands thereby extending into said molding cavity at a substantially perpendicular angle to each other, whereby a finished article within said mold includes mutually perpendicular reentrant portions engaged respectively by said first and second lands, said first mold part being movable relative to the other of said mold parts along an axis parallel to said axis along which said first land extends, whereby when said mold is opened, said first mold part land is withdrawn from said article and said article is supported by said second mold part land against movement along said first axis and is positioned for removal thereof by movement of said article as a whole along an axis parallel to the extent of said second mold land.

2. A multi-part mold assembly for manufacturing molded articles from a curable, initially fluent elastomeric material, said assembly comprising at least first and second, relatively movable mold parts each including surfaces thereon generally directed toward corresponding surfaces on the other of said mold parts, all of said surfaces combining to define a molding cavity having the shape of an article to be molded, said first mold part having a first land extending into said molding cavity along a first axis extending generally radially of said article, said second mold part having a second land extending into said molding cavity along an axis generally parallel to the axis of said article, said first and second lands thereby extending into said molding cavity at a substantially perpendicular angle to each other, whereby a finished article within said mold includes mutually perpendicular reentrant portions engaged respectively by said first and second lands, said first mold part being movable relative to the other of said mold parts along a second axis perpendicular to said axis along which said first land extends, whereby when said mold is opened, said second mold part land is withdrawn relative to said article and said article is supported by said first mold part land against movement relative to said first land along said second axis and is positioned for removal thereof by movement of said article as a whole along a generally radial axis parallel to the extent of said first mold land.

3. A mold assembly as defined in claim 2 which further includes a stripper plate mounted for movement parallel to the plane of said first mold part land, whereby said article may be removed from engagement with said first mold part by stripper plate movement.

4. A mold assembly as defined in claim 3 which further includes ejector pins for engaging and moving said stripper plate, said pins being located by said mold assembly for movement only when said pins are in a position of registry with said stripper plate.

5. A multi-part mold assembly for manufacturing a pair of semi-annular insert molded articles each of which comprise a metal stiffener portion and an elastomeric body portion at least partially surrounding said metal insert portion, said mold assembly comprising, in combination, first, second and third mold elements, means supporting and aligning said mold elements for opening and closing movement along a first, single axis, said three mold elements including surfaces defining, in the closed position of said parts, first and second, generally semi-annular molding cavities, said first mold element including a pair of generally radially inwardly directed surfaces adapted to form the radially outer surfaces of said molded articles, said third mold element including generally radially outwardly directed surfaces adapted to form the radially inner surface of said molded articles, said second mold element comprising an intermediate, semi-annular saddle portion having a pair of generally axially outwardly directed surface portions adapted to form one end face of said molded articles, at least one of said first and third mold elements having generally axially directed surfaces adapted to form the other end faces of said molded articles, said first mold element including a pair of generally radially inwardly extending land portions adapted to form reentrant portions in said molded articles, and to extend between respective flange portions of inserts received in said cavities, said saddle portion including a pair of axially outwardly directed lands each adapted to lie in radially overlapping relation to a portion of said insert disposed in said molding cavity, said lands on said saddle extending substantially perpendicular to said first pair of lands and forming an axially extending reentrant in each of said articles, sand lands on said first element being freely removable from said reentrants in said molded articles when said mold is opened along said first axis, said lands on said saddle extending into said reentrants on said articles and thereby preventing removal of said articles from said mold along said first axis, said molded articles being thereby supported for removal from said second mold part along an axis perpendicular to said movement axis of said mold parts and parallel to the axis of said article.

6. A multi-part mold assembly as defined in claim 5 in which said first mold element further includes a bottom plate portion including surfaces defining the radially extending end portions of said semi-annular articles, said bottom plate also including first and second vacuum pockets for each end of each of said cavities, with said plate having a tapered passage extending from each end of each cavity to an adjacent first vacuum pocket and tapered passages extending from each first pocket to each second pocket, said passages extending from molding cavity ends to said first pockets being of reduced cross section adjacent said ends of said molding cavities and said passages extending from said first pockets to said second pockets being of reduced cross section adjacent said first pockets.

7. A multi-part mold assembly for manufacturing a pair of semi-annular insert molded articles each of which comprises a metal stiffener portion and an elastomeric body portion at least partially surrounding said metal insert portion, said mold assembly comprising, in combination, a pair of first mold elements, and a second mold element, means supporting and aligning said mold elements for opening and closing movement along a first, single axis, said mold elements including surfaces defining, in the closed position of said elements, first and second, generally semi-annular molding cavities, said pair of first mold elements including a pair of generally radially inwardly directed surfaces adapted to form the radially outer surfaces of said molded articles, said second mold element including generally radially outwardly directed surfaces adapted to form the radially inner surface of said molded articles, and an intermediate portion having a pair of generally axially outwardly directed surface portions adapted to form one end face of said molded articles, said pair of first mold elements having generaly axially directed surfaces adapted to form the other end face of said molded articles, said pair of first mold elements including a pair of generally radially inwardly extending land portions adapted to form reentrant portions in said molded articles, and to extend between respective flange portions of inserts received in said cavities, said second mold element including a pair of axially outwardly directed lands each adapted to lie in radially overlapping relation to a portion of said insert disposed in said molding cavity, said lands on said second mold element extending substantially perpendicular to said first pair of lands and forming an axially extending reentrant in each of said articles, said lands on said second mold element being freely removable from said reentrants in said molded articles when said mold is opened along said first axis, said lands on said pair of first mold elements extending into said reentrants on said articles and thereby preventing removal of said articles from said mold along said first axis, said molded articles being thereby supported for removal from said pair of first mold part along an axis perpendicular to said movement axis of said mold parts and perpendicular to the axis of said articles.

8. A mold assembly as defined in claim 7 in which each of said pair of first mold elements includes a stripper plate associated therewith, said mold assembly further including means for moving said stripper plates perpendicular to said axis of said articles for removing said articles from said pair of said first mold elements.

9. A mold assembly as defined in claim 7 in which each of said pair of first mold elements includes an inclined slot, said assembly further including a mold opening element which includes a pair of spaced apart, downwardly and outwardly extending legs adapted to be received respectively in said inclined slots, whereby upward movement of said mold opening element will cause movement of said first pair of mold elements along said first, single axis.

10. A multi-part mold assembly as defined in claim 7 in which said second mold element includes a runner for elastomeric material, said runner having a first passage at one end thereof communicating with one of said mold cavities and a second passage at the other end thereof communicating with the other of said cavities, said second element further including a first vacuum pocket for one of said cavities and a second vacuum pocket for the other of said cavities, said first and second pockets being associated respectively with the ends of said cavities lying opposite said inlet passages, whereby material for making said articles may be directed through said passages into one end of said semi-annular cavities and may then by drawn to the other end of said cavities by vacuum applied to said pockets.

11. In a mold apparatus having parts including surfaces cooperating to define a mold cavity, at least one of said parts being movable with respect to the other of said parts, at least one of said parts including a runner for the inlet of curable fluent elastomeric material and at least one part having a vacuum passage for connection to means for evacuating said cavity, the improvement comprising first and second pockets within said vacuum passage, said pockets being arranged in series with each other, a tapered first passage extending from said cavity to said first pocket and a tapered second passage extending from said first pocket to said second pocket, said first and second passages being of reduced cross section, respectively, adjacent said cavity and said first pocket, the depth of said first passage in the portion thereof adjacent said cavity being greater than the depth of the portion of said second passage adjacent said first cavity, whereby certain of said material may flow from said runner through said mold cavity and at least partially into said first pocket, but whereby said material is prevented by said lesser depth of said adjacent portion of said second passage from entry into said second pocket.

* * * * *